US012379733B2

(12) United States Patent
Torii et al.

(10) Patent No.: US 12,379,733 B2
(45) Date of Patent: Aug. 5, 2025

(54) CONTROL DEVICE AND CONTROL METHOD

(71) Applicant: SONY GROUP CORPORATION, Tokyo (JP)

(72) Inventors: Kuniaki Torii, Tokyo (JP); Mikio Nakai, Tokyo (JP); Yusuke Kudo, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/663,945

(22) Filed: May 14, 2024

(65) Prior Publication Data
US 2024/0302843 A1    Sep. 12, 2024

Related U.S. Application Data

(63) Continuation of application No. 17/052,753, filed as application No. PCT/JP2019/007032 on Feb. 25, 2019, now Pat. No. 12,117,848.

(30) Foreign Application Priority Data
May 15, 2018   (JP) .................. 2018-093670

(51) Int. Cl.
G05D 1/24      (2024.01)
G05D 1/247     (2024.01)
(Continued)

(52) U.S. Cl.
CPC ............. *G05D 1/249* (2024.01); *G05D 1/247* (2024.01); *G06V 20/10* (2022.01); *G06V 40/10* (2022.01); *G10L 15/1815* (2013.01); *G10L 15/22* (2013.01)

(58) Field of Classification Search
CPC ........ G05D 1/249; G05D 1/247; G06V 20/10; G10L 15/1815; G10L 15/22
See application file for complete search history.

(56) References Cited

U.S. PATENT DOCUMENTS

2006/0184277 A1*  8/2006  Decuir ................... G10L 17/00
                                              700/245
2007/0150099 A1   6/2007  Lee et al.
(Continued)

FOREIGN PATENT DOCUMENTS

CN   103218654 A   7/2013
CN   107116563 A   9/2017
(Continued)

OTHER PUBLICATIONS

Kubota, et al., "A study on partner robots using emotional model: Construction of virtual-reality space and interaction with people in the space", Journal of Japan Society for Fuzzy Theory and Intelligent Informatics, vol. 20, No. 4, Jan. 2008, pp. 449-460.
(Continued)

Primary Examiner — Kira Nguyen
(74) Attorney, Agent, or Firm — CHIP LAW GROUP

(57) ABSTRACT

A control device includes a recognizing unit that recognizes an external environment based on sensing information, an action decision managing unit that, based on the recognized external environment, decides on actions to be taken, a behavior managing unit that, based on at least either difficulty level of recognition for the recognizing unit or difficulty level of action decision for the action decision managing unit, determines about whether or not to exhibit emotional expressions, and a drive control unit that, based on the determination performed by the behavior managing unit, controls execution of the actions corresponding to the emotional expressions.

20 Claims, 6 Drawing Sheets

(51) Int. Cl.
  *G05D 1/249*   (2024.01)
  *G06V 20/10*   (2022.01)
  *G06V 40/10*   (2022.01)
  *G10L 15/18*   (2013.01)
  *G10L 15/22*   (2006.01)

(56) References Cited

U.S. PATENT DOCUMENTS

| | | | |
|---|---|---|---|
| 2007/0192910 | A1 | 8/2007 | Vu et al. |
| 2007/0213872 | A1 | 9/2007 | Matsuzaki et al. |
| 2009/0099693 | A1 | 4/2009 | Kang et al. |
| 2018/0081365 | A1 | 3/2018 | Asukai et al. |
| 2018/0089013 | A1* | 3/2018 | Otsuka ................ G06F 11/324 |
| 2018/0275677 | A1* | 9/2018 | Hamada ............... G05D 1/0246 |
| 2018/0370039 | A1 | 12/2018 | Nakagome et al. |
| 2019/0030723 | A1* | 1/2019 | Hayashi ................ B25J 11/001 |

FOREIGN PATENT DOCUMENTS

| | | |
|---|---|---|
| EP | 1544762 A1 | 6/2005 |
| JP | 2001-038658 A | 2/2001 |
| JP | 2001242892 A | 9/2001 |
| JP | 2005022065 A | 1/2005 |
| JP | 2005-193330 A | 7/2005 |
| JP | 2006015435 A | 1/2006 |
| JP | 2007-123127 A | 5/2006 |
| JP | 2013-208661 A | 10/2013 |
| JP | 2013-208681 A | 10/2013 |
| JP | 2014186421 A | 10/2014 |
| JP | 2017169826 A | 9/2017 |
| JP | 2017175559 A | 9/2017 |
| JP | 2017-213112 A | 12/2017 |
| KR | 10-2007-0061054 A | 6/2007 |
| KR | 10-0893758 B1 | 4/2009 |
| WO | 2009/107185 A1 | 9/2009 |
| WO | 2017/175559 A1 | 10/2017 |
| WO | 2018/016461 A1 | 1/2018 |

OTHER PUBLICATIONS

International Search Report and Written Opinion of PCT Application No. PCT/JP2019/007032, issued on Apr. 23, 2019, 06 pages of English Translation and 06 pages of ISRWO.

Office Action for CN Patent Application No. 201980030955.2, issued on Nov. 30, 2021, 17 pages of English Translation and 09 pages of Office Action.

Notice of Allowance for U.S. Appl. No. 17/052,753, issued on Jan. 24, 2024, 05 pages.

Non-Final Office Action for U.S. Appl. No. 17/052,753, issued on Aug. 1, 2023, 12 pages.

International Preliminary Report on Patentability of PCT Application No. PCT/JP2019/007032, issued on Nov. 26, 2020, 06 pages of English Translation and 03 pages of IPRP.

Notice of Allowance for U.S. Appl. No. 17/052,753 dated Jun. 11, 2024.

* cited by examiner

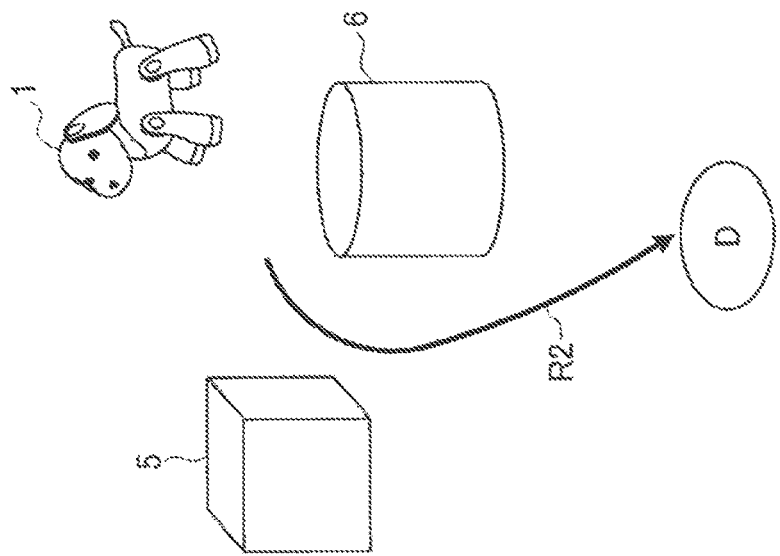
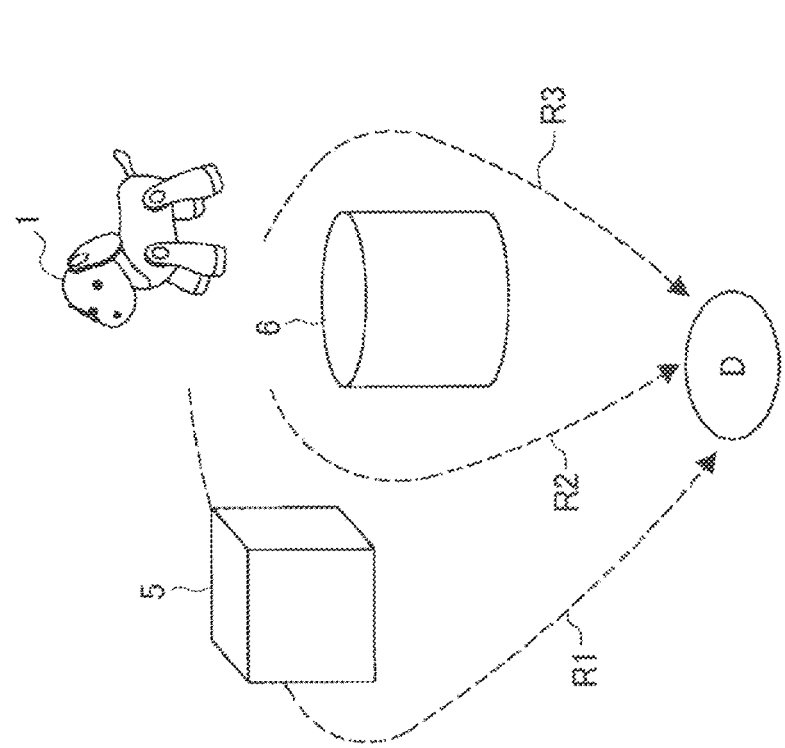
FIG.1

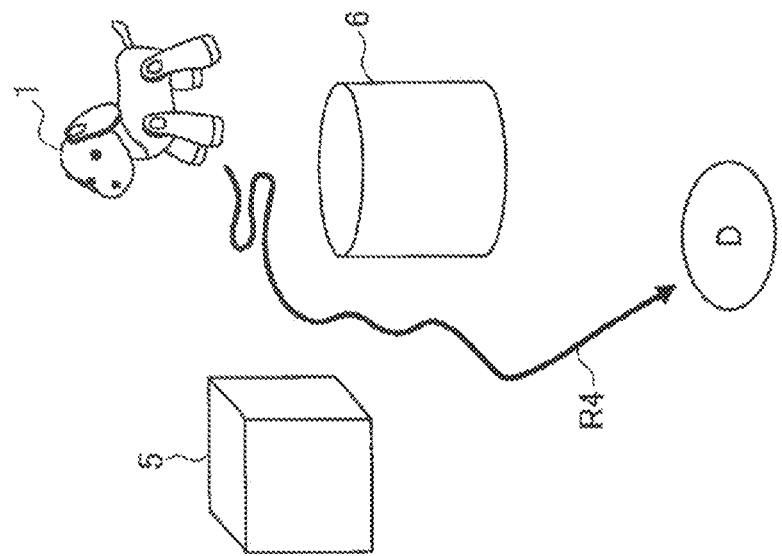
FIG.2
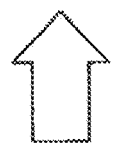
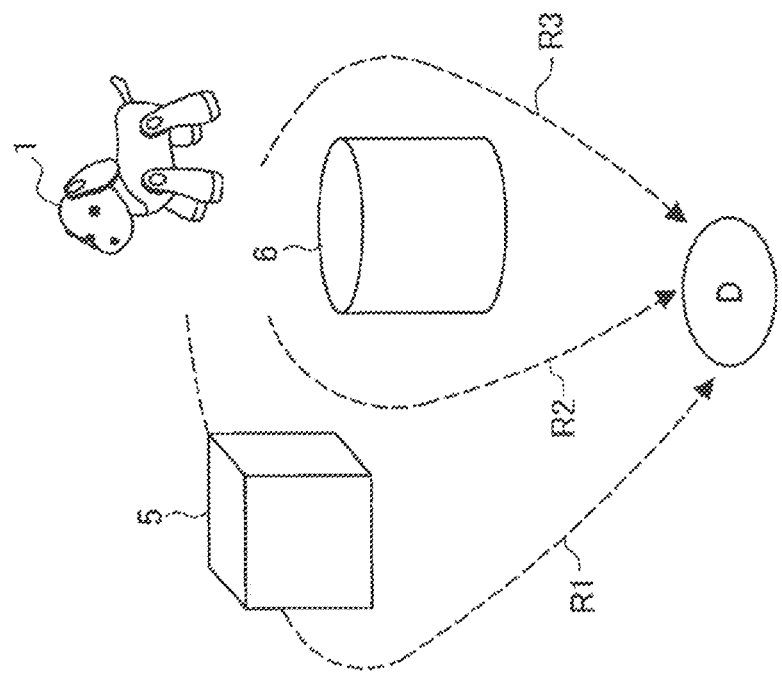

CONTROL DEVICE AND CONTROL METHOD

CROSS REFERENCE TO RELATED APPLICATIONS

This application is a continuation application of U.S. patent application Ser. No. 17/052,753 filed on Nov. 3, 2020, which is a U.S. National Phase of International Patent Application No. PCT/JP2019/007032 filed on Feb. 25, 2019, which claims priority benefit of Japanese Patent Application No. JP 2018-093670 filed in the Japan Patent Office on May 15, 2018. Each of the above-referenced applications is hereby incorporated herein by reference in its entirety.

FIELD

The application concerned is related to a control device, a control method, and a program.

BACKGROUND

In recent years, robot devices that are mechanical devices replicating the actions of living beings using electrical or magnetic effects have gained widespread use. For example, manipulator robot devices or delivery robot devices have gained widespread use with the aim of achieving automation of the production work in factories.

At the same time, the development of utility robot devices has been going on for the purpose of supporting human activity as human partners in various situations in the living environment and the day-to-day life. Unlike the industrial robot devices that perform certain actions in a repeated manner, the utility robot devices are required to have the capability of flexibly adapting to various situations in the living environment of human beings.

Examples of utility robot devices, which are already put to practical use, include pet-type robot devices replicating the body mechanism of a quadrupedal animal such as a dog or a cat, and humanoid robot devices replicating the body mechanism of a human being who walks upright on two legs. Such robot devices which perform various actions focusing on the entertainment aspect are particularly called entertainment robots.

In order to further enhance the entertainment aspect; an entertainment robot is required to perform actions that keep the user from getting bored and that raise interest of the user. For example, in Patent Literature 1 mentioned below, a technology is disclosed in which irregular vector movements are generated by mixing the vectors of the movements of a robot device with the vectors of the movements of another subject such as a user, and the robot device is made to perform random movements having less repetition.

CITATION LIST

Patent Literature

Patent Literature 1: Japanese Laid-open Patent Publication No. 2006-123127

SUMMARY

Technical Problem

However, in the technology disclosed in Patent Literature 1, although a robot device is made to perform random movements, it is difficult to make a robot device perform movements having specific meaning. More particularly, in the technology disclosed in Patent Literature 1, it is difficult to make a robot device perform actions for expressing emotions, character, and thinking so as to evoke the feelings of personal attachment toward the robot device in the user.

In that regard, there is a demand for a technology that makes a robot device perform, in a more effective manner, actions that evoke the feelings of personal attachment toward the robot device in the user.

Solution to Problem

According to the application concerned, a control device is provided that includes: a recognizing unit that recognizes external environment based on sensing information; an action decision managing unit that, based on the recognized external environment, decides on action to be taken; a behavior managing unit that, based on at least either difficulty level of recognition for the recognizing unit or difficulty level of action decision for the action decision managing unit, determines about whether or not to exhibit emotional expression; and a drive control unit that, based on determination performed by the behavior control unit, controls execution of action corresponding to the emotional expression.

Moreover, according to the application concerned, a control method implemented in an arithmetic device is provided that includes: recognizing external environment based on sensing information; deciding that, based on the recognized external environment, includes deciding on action to be taken; determining that, based on at least either difficulty level of recognition or difficulty level of action decision, includes determining about whether or not to exhibit emotional expression; and controlling that, based on determination, includes controlling execution of action corresponding to the emotional expression.

Furthermore, according to the application concerned, a program is provided that causes a computer to function as: a recognizing unit that recognizes external environment based on sensing information; an action decision managing unit that, based on the recognized external environment, decides on action to be taken; a behavior managing unit that, based on at least either difficulty level of recognition for the recognizing unit or difficulty level of action decision for the action decision managing unit, determines about whether or not to exhibit emotional expression; and a drive control unit that, based on determination performed by the behavior control unit, controls execution of action corresponding to the emotional expression.

According to the application concerned, in a situation in which the user expects the robot device to take actions that evoke the feelings of affection and personal attachment, the robot device can be selectively made to take actions that evoke the feelings of affection and personal attachment.

Advantageous Effects of Invention

As explained above, according to the application concerned, a robot device can be made to perform, in a more effective manner, actions that evoke the feelings of personal attachment toward the robot device in the user.

Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 1 is an explanatory diagram illustrating the actions of a robot device that are controlled by a control device according to a comparison example.

FIG. 2 is an explanatory diagram illustrating the actions of a robot device that are controlled by a control device according to an embodiment of the application concerned.

DESCRIPTION OF EMBODIMENTS

Figure 3:
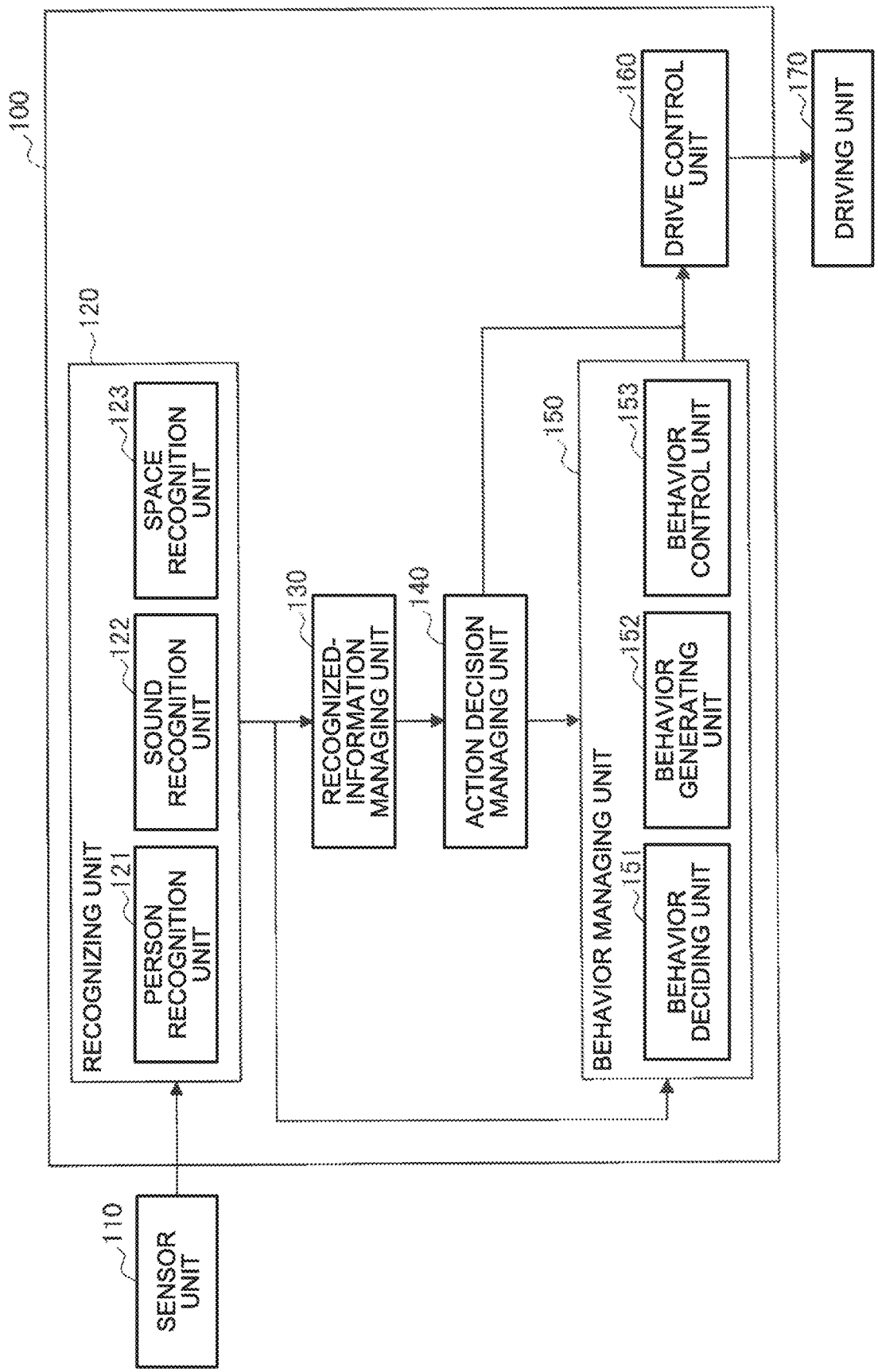
FIG. 3 is a block diagram illustrating a functional configuration of the control device according to the present embodiment.

A preferred embodiment of the application concerned is described below in detail with reference to the accompanying drawings. In the present written description and the drawings, the constituent elements having practically identical functional configuration are referred to by the same reference numerals, and the explanation is not given repeatedly.

The explanation is given in the following sequence.
1. Overview of control device
2. Exemplary configuration of control device
3. Example of operations of control device
3.1. Overall flow of operations
3.2. Specific example of behavior determination
4. Exemplary hardware configuration
5. Summary <1. Overview of control device>

Firstly, explained with reference to FIGS. 1 and 2 is the overview of a control device according to the embodiment of the application concerned. FIG. 1 is an explanatory diagram illustrating the actions of a robot device that are controlled by a control device according to a comparison example; and FIG. 2 is an explanatory diagram illustrating the actions of a robot device that are controlled by the control device according to the present embodiment.

As illustrated in FIGS. 1 and 2, consider a case in which a control device controls the actions of a robot device 1 that reaches a destination D by avoiding obstacles 5 and 6.

The robot device 1 is, what is called, an entertainment robot used as a robotic pet or an ornamental robot; and, for example, can be a pet-type quadrupedal robot device modeled on a dog. However, in the technology according to the application concerned, there is no particular restriction on the shape and the structure of the robot device 1. For example, the robot device 1 can be a pet-type robot modeled on some other animal such as a cat or a bird, or can be a humanoid robot device modeled on a human being who walks upright on two legs, or can be a robot device that moves around on wheels. Meanwhile, the obstacles 5 and 6 are three-dimensional objects that may impose a restriction on the path for the robot device 1. For example, the obstacles 5 and 6 can be three-dimensional objects having a comparable size to the robot device 1.

In order to reach the destination D, the robot device 1 can take a plurality of routes, namely a first route R1, a second route R2, and a third route R3 attributed to the presence of the obstacles 5 and 6. More particularly, the first route R1 enables reaching the destination D by passing around the outside of the obstacle 5; the second route R2 enables reaching the destination D by passing in between the obstacles 5 and 6; and the third route R3 enables reaching the destination D by passing around the outside of the obstacle 6. Of those routes, the second route R2 has a small width on account of passing in between the obstacles 5 and 6, but has the shortest distance to the destination D. The first route R1 and the third route R3 have a large width on account of passing around the outside of the obstacles 5 and 6, respectively, but have longer distances to the destination D as compared to the second route R2.

As illustrated in FIG. 1, when the robot device 1 takes the second route R2 and reaches the destination D without any hitch, then sometimes the user may not feel any affection toward the actions of the robot device 1.

That is because the second route R2 is the efficient path having the shortest distance to the destination D, and thus the user may feel that the robot device 1 that takes the second route R2 is inorganic and mechanical in its actions. Moreover, since the second route R2 has a small width on account of passing in between the obstacles 5 and 6; in order to take the second route R2, it becomes important that the shapes and the positions of the obstacles 5 and 6 present on both sides are recognized with high accuracy. Hence, if the robot device 1 takes the second route R2 without any hitch, it does not represent the cautious behavior that the user expects of the robot device 1 while taking a narrow path.

On the other hand, assume that the robot device 1 exhibits hesitation at the time of selecting a route from among the first route R1, the second route R2, and the third route R3, and then takes a fourth route R4 that is similar to the second route R2 to reach the destination D. In that case, the robot device 1 can give the user an impression of pondering over the route to be taken to reach the destination D. Moreover, at the time of passing in between the obstacles 5 and 6, if the robot device 1 decelerates and moves slowly, it can give the user an impression of being uneasy but cautious.

As a result of exhibiting behavior indicating emotions, character, and thinking (in the following explanation, also called emotional expressions) to the user, the robot device 1 becomes able to evoke the feelings of personal attachment and affection toward itself in the user. That is, as a result of making the robot device 1 take actions that are added with a redundant behavior causing a decline in the efficiency in comparison to the most efficient actions; it becomes possible to give the user an impression that the robot device 1 has emotions, character, and thoughts. As a result, instead of giving an impression of being inorganic and mechanical, the robot device 1 can give the user an impression that evokes the feelings of affection and personal attachment close to the feelings toward a living being.

However, such behavior indicating emotions, character, and thinking causes a decline in the efficiency of the actions of the robot device 1. Hence, if the robot device 1 exhibits such behavior on a constant basis, then it leads to a significant increase in the power consumption. Moreover, when there are no obstacles such as the obstacles 5 and 6 and when the situation demands less complexity and difficulty in the selection of actions or the execution of actions, if the robot device 1 is made to exhibit redundant behavior as explained above, it may cause unpleasant frustration to the user.

Hence, regarding the actions of the robot device 1 as illustrated in FIG. 2 that evoke the feelings of affection and personal attachment in the user, it is effective that such actions are taken when the user expects the robot device 1 to do so.

In the control device according to the present embodiment, based on at least either the difficulty level of recognition for the robot device 1 in recognizing the external environment or the difficulty level of action decision for the robot device 1, it is determined about whether or not to exhibit behavior (emotional expressions) that evokes the feelings of affection and personal attachment in the user. As a result, in a situation in which the user may tolerate redundant actions of the robot device 1, the control device according to the present embodiment becomes able to make the robot device 1 exhibit emotional expressions.

Thus, the control device according to the present embodiment can make the robot device 1 exhibit emotional expressions in a more effective situation so as to evoke the feelings of affection and personal attachment in the user, thereby enabling achieving reduction in the power consumption of the robot device 1. Moreover, even when the robot device 1 is made to exhibit redundant emotional expressions that are low in efficiency, the control device according to the present embodiment can lower the possibility of causing a sense of discomfort such as frustration or irritation to the user.

Furthermore, in the control device according to the present embodiment, whether or not to make the robot device 1 exhibit emotional expressions can be determined based on the degree of attention of the user toward the robot device 1. As a result, when it is determined that the user is paying attention to the robot device 1 and is recognizing the actions of the robot device 1, the control device according to the present embodiment can make the robot device 1 exhibit emotional expressions. Thus, in a situation in which the user is paying attention, the control device according to the present embodiment can more effectively make the robot device 1 exhibit emotional expressions that evoke the feelings of affection and personal attachment in the user.

<2. Exemplary configuration of control device>

Explained below with reference to FIG. 3 is an exemplary configuration of the control device according to the present embodiment. FIG. 3 is a block diagram illustrating a functional configuration of a control device 100 according to the present embodiment.

As illustrated in FIG. 3, the control device 100 includes the following: a recognizing unit 120 that obtains sensing information from a sensor unit 110; a recognized-information managing unit 130 that manages the recognized information; an action decision managing unit 140 that manages the actions decided based on the recognized information; a behavior managing unit 150 the manages the emotional expressions representing the behavior for evoking the feelings of affection and personal attachment in the user; and a drive control unit 160 that controls a driving unit 170 of the robot device 1. The control device 100 can be, for example, a control device that decides on the actions based on the sensing information about the external environment as detected by the sensor unit 110, and instructs the driving unit 170 to make the robot device 1 take the decided actions.

The sensor unit 110 includes various sensors; measures the state of the external environment; and outputs the measurement data to the recognizing unit 120. The sensor unit 110 can also be installed, for example, inside the robot device 1. As the sensors for measuring the state of the external environment, the sensor unit 110 can include, for example, various cameras such as an RGB camera, a grayscale camera, a stereo camera, a depth camera, an infrared camera, and a ToF (Time of Flight) camera; or can include various ranging radars such as a LIDAR (Laser Imaging Detection and Ranging) sensor and a RADAR (Radio Detecting and Ranging) sensor. Moreover, as the sensors for measuring other information of the environmental environment, the sensor unit 110 can include a microphone, an illuminometer, a pressure gauge, a thermometer, and a hygrometer. Of course, it goes without saying that, as long as a sensor is capable of measuring the state of the external environment, the sensor unit 110 can include any other known sensors.

Moreover, the sensor unit 110 can also include sensors for measuring the state of the robot device 1. The measurement data of the state of the robot device 1 can be used by the control device 100 in, for example, deciding or controlling the actions of the robot device 1. For example, as the sensors for measuring the state of the robot device 1, the sensor unit 110 can include an encoder, a voltmeter, an ammeter, a strain meter, a gyro sensor, an acceleration sensor, an IMU (Inertial Measurement Unit), and a GNSS (Global Navigation Satellite System) sensor.

The recognizing unit 120 includes, for example, a person recognition unit 121, a sound recognition unit 122, and a space recognition unit 123; and recognizes the external environment based on the data measured by the sensor unit 110.

More particularly, based on image information or sound information measured by the sensor unit 110, the person recognition unit 121 can recognize the presence or absence of a person in the surrounding space. Moreover, the person recognition unit 121 can also perform individuality identification of the person present in the surrounding space, and can further recognize the line of sight and the expressions of the person who is recognized to be present. The sound recognizing unit 122 can recognize, based on the sound information measured by the sensor unit 110, the details (i.e., the context) of the speech or the conversion of the user present in the surrounding space. The space recognizing unit 123 can perform, based on the image information and ranging information measured by the sensor unit 110, obstacle recognition, shape recognition (i.e., wall recognition or floor recognition), and object recognition; and can recognize the objects and the shapes present in the surrounding space. Moreover, for example, the space recognition unit 123 can further recognize the possible routes to the destination and recognize the features of the routes such as the width, the distance, and the surface asperity. Herein, the recognition performed by the person recognition unit 121, the sound recognizing unit 122, and the space recognizing unit 123 of the recognizing unit 120 can be performed, for example, based on predetermined rules or based on a machine learning algorithm such as a DNN (Deep Neural Network). Alternatively, such recognition can be performed using a known recognition technology.

The recognized-information managing unit 130 converts a variety of information recognized by the recognizing unit 120 into information suitable for use in the action decision managing unit 140 and the behavior managing unit 150.

More particularly, based on the recognition result about the presence or absence of a person and based on the identification result about the individuality of the person as obtained by the recognizing unit 120, the recognized-information managing unit 130 can generate the detection result about the user of the robot device 1 in the surrounding space.

Moreover, based on the recognition result about the expressions or the line of sight of a person as obtained by the recognizing unit 120, the recognized-information managing unit 130 can calculate the degree of attention of the user toward the robot device 1. For example, based on whether or not the line of sight or the field of view of the user is directed toward the robot device 1, the recognized-information managing unit 130 can calculate the degree of attention of the user toward the robot device 1.

Moreover, based on the recognition result about the speech details as obtained by the recognizing unit 120, the recognized-information managing unit 130 can calculate the degree of attention of the user toward the robot device 1. For example, based on whether or not the robot device 1 is mentioned in the speech of the user or based on whether or not the user is addressing the robot device 1, the recognized-information managing unit 130 can calculate the degree of attention of the user toward the robot device 1.

The degree of attention of the user toward the robot device 1 as calculated by the recognized-information managing unit 130 can be used by the behavior managing unit 150 (described later) as one of the determination factors for determining whether or not to instruct the robot device 1 to exhibit emotional expressions that evoke the feelings of personal attachment in the user.

For example, when the user is looking straight at the robot device 1, or when it is determined that the user is aurally aware about the movements of the robot device 1, or when the robot device 1 is mentioned in the speech of the user, or when the user is addressing the robot device 1, or when the user is operating the robot device 1; the recognized-information managing unit 130 can determine that the user has a high degree of attention toward the robot device 1. In such a case, the behavior managing unit 150 (described later) can determine to make the robot device 1 exhibit emotional expressions.

Moreover, when the user has the robot device 1 in his or her peripheral vision or when the user can be made to recognize the presence of the robot device 1 according to a sound, the recognized-information managing unit 130 can determine that the user has a medium degree of attention toward the robot device 1. In such a case, the behavior managing unit 150 (described later) can determine that, although the user does not have a high degree of attention toward the robot device 1, there is room for making the user pay attention to the robot device 1; and can determine to make the robot device 1 exhibit emotional expressions.

Furthermore, when the user is absent, or when the user is paying attention to something other than the robot device 1, or when it is determined that the user is not interested in the robot device 1 because of the same repeated actions taken by the robot device 1, the recognized-information managing unit 130 can determine that the user has a low degree of attention toward the robot device 1. In such a case, the behavior managing unit 150 (described later) can determine not to make the robot device 1 exhibit emotional expressions.

Moreover, based on the recognition result about the surrounding space as obtained by the recognizing unit 120, the recognized-information managing unit 130 can generate a map of the surrounding space. For example, the recognized-information managing unit 130 can generate an obstacle map or a movement area map indicating the transitable area, or can generate an object map indicating the positions of various objects, or can generate a topological map indicating the naming, the association, and the meaning of each area.

Furthermore, based on a variety of information recognized by the recognizing unit 120, the recognized-information managing unit 130 calculates the difficulty level of recognition for the recognizing unit 120. The difficulty level of recognition for the recognizing unit 120 as calculated by the recognized-information managing unit 130 can be used by the behavior managing unit 150 (described later) as one of the determination factors about determining whether or not to instruct the robot device 1 to exhibit emotional expressions that evoke the feelings of personal attachment in the user.

More particularly, the recognized-information managing unit 130 can calculate the difficulty level of recognition for the recognizing unit 120 based on at least one or more of the following: the number and types of sensors included in the sensor unit 110; the complexity of the external environment recognized by the recognizing unit 120; the recognition algorithm implemented by the recognizing unit 120; and the reliability or the required accuracy of the recognition result obtained by the recognizing unit 120.

More particularly, based on at least one or more elements of Table 1 given below, the recognized-information managing unit 130 can calculate the difficulty level of recognition for the recognizing unit 120. For example, the recognized-information managing unit 130 can determine the difficulty level of recognition regarding each element of Table 1 given below, and accordingly calculate the difficulty level of recognition for the recognizing unit 120. Alternatively, the recognized-information managing unit 130 can holistically determine the difficulty level by assigning a weight to each element of Table 1 given below, and accordingly calculate the difficulty level of recognition for the recognizing unit 120. Still alternatively, the recognized-information managing unit 130 can calculate the difficulty level of recognition for the recognizing unit 120 according to any other arbitrary method other than the methods explained above.

TABLE 1

|  | Recognition difficulty (low) | Recognition difficulty (high) |
| --- | --- | --- |
| Number of sensors | few | many |
| Sensor type | few | many |
| Recognition Algorithm Load | low | high |
| number of objects to be recognized | Few | many |
| Recognition target stability | Stable(stationary or fixed in number) | Unstable(moving or fluctuating in number) |
| Reliability of recognition results | High | low |
| Accuracy required for recognition results | Low | high |

Meanwhile, based on the attributes of the user, the recognized-information managing unit 130 can modify the calculation criteria for calculating the difficulty level of recognition for the recognizing unit 120. More particularly, based on the age or the gender of the user, based on the hobbies and the liking of the user, or based on the amount of knowledge of the user regarding the robot device 1; the recognized-information managing unit 130 can modify the calculation criteria for calculating the difficulty level of recognition for the recognizing unit 120. For example, for a user having a high level of interest in robots, the recognized-information managing unit 130 can modify the calculation criteria in such a way that the calculated difficulty level of recognition becomes lower. On the other hand, for a user having a low level of interest in robots, the recognized-information managing unit 130 can modify the calculation criteria in such a way that the calculated difficulty level of recognition becomes higher.

For example, the attributes of the user that are to be used in modifying the calculation criteria for calculating the difficulty level of recognition can be determined from the registration information of the user, or can be determined from the information input in a questionnaire for the user, or can be determined from the information shared in the SNS (Social Networking Service) platforms.

Then, based on the recognition information converted by the recognized-information managing unit 130, the action decision managing unit 140 generates actions of the robot device 1 and calculates the difficulty level of action decision. More particularly, based on the recognition result about the external environment as processed by the recognized-information managing unit 130, the action decision managing unit 140 decides on the actions to be taken by the robot device 1. For example, based on the map of the surrounding space as generated by the recognized-information managing unit 130, the action decision managing unit 140 can decide on the route to be taken by the robot device 1 to move toward the destination. Apart from deciding on the movement of the robot device 1, the action decision managing unit 140 can also decide on various other actions of the robot device 1. The action decision performed by the action decision managing unit 140 can be performed, for example, based on predetermined rules or based on a machine learning algorithm such as a DNN (Deep Neural Network).

Moreover, after deciding on the actions of the robot device 1, the action decision managing unit 140 calculates the difficulty level of action decision. The difficulty level of action decision as calculated by the action decision managing unit 140 can be used by the behavior managing unit 150 (described later) as one of the determination factors about determining whether or not to instruct the robot device 1 to exhibit emotional expressions that evoke the feelings of personal attachment in the user.

More particularly, the action decision managing unit 140 can calculate the degree of difficulty of action decision based on at least one of the following: the complexity of action decision or limiting conditions; the number of options for the actions taken into account at the time of action decision; and the presence or absence of relative merits or history.

More particularly, based on at least one or more elements of Table 2 given below, the action decision managing unit 140 can calculate the difficulty level of action decision. For example, the action decision managing unit 140 can determine the difficulty level of action decision regarding each element of Table 2 given below, and accordingly calculate the difficulty level of action decision. Alternatively, the action decision managing unit 140 can holistically determine the difficulty level by assigning a weight to each element of Table 2 given below, and accordingly calculate the difficulty level of action decision. Still alternatively, the action decision managing unit 140 can calculate the difficulty level of action decision according to any other arbitrary method other than the methods explained above.

TABLE 2

|  | Action decision difficulty (low) | Action decision difficulty (high) |
| --- | --- | --- |
| number of possible action options | few | many |
| Presence or absence of superiority or inferiority of options | Yes | no |
| Clarity of superiority or inferiority of options | High | low |
| number of constraints in action decision | few | many |
| action history | Yes or many | No or a few |

In an identical manner to the recognized-information managing unit 130, the action decision managing unit 140 can modify the calculation criteria for calculating the difficulty level of action decision based on the attributes of the user. More particularly, based on the age or the gender of the user, based on the hobbies and the liking of the user, or based on the amount of knowledge of the user regarding the robot device 1; the action decision managing unit 140 can modify the calculation criteria for calculating the difficulty level of action decision. For example, for a user having a high level of interest in robots, the action decision managing unit 140 can modify the calculation criteria in such a way that the calculated difficulty level of action decision becomes lower. On the other hand, for a user having a low level of interest in robots, the action decision managing unit 140 can modify the calculation criteria in such a way that the calculated difficulty level of action decision becomes higher.

For example, the attributes of the user that are to be used in modifying the calculation criteria for calculating the difficulty level of action decision can be determined from the registration information of the user, or can be determined from the information input in a questionnaire for the user, or can be determined from the information shared in the SNS (Social Networking Service) platforms.

The behavior managing unit 150 includes a behavior deciding unit 151, a behavior generating unit 152, and a behavior control unit 153; and determines about whether or not to exhibit emotional expressions that evoke the feelings of personal attachment about the robot device 1 in the user, and generates actions corresponding to emotional expressions.

Firstly, based on at least either the difficulty level of recognition as calculated by the recognized-information managing unit 130 or the difficulty level of action decision as calculated by the action decision managing unit 140, the behavior deciding unit 151 determines about whether or not to exhibit emotional expressions that evoke the feelings of personal attachment about the robot device 1 in the user. More particularly, when the difficulty level of recognition for the recognizing unit 120 is high and when the user may assume that it is difficult for the robot device 1 to assess or judge the situation, the behavior deciding unit 151 can determine to make the robot device 1 exhibit emotional expressions. Moreover, when the difficulty level of action decision for the action decision managing unit 140 is high and when the user may assume that it is difficult for the robot device 1 to select an action, the behavior deciding unit 151 can determine to make the robot device 1 exhibit emotional expressions.

Meanwhile, based on whether or not the user is present in the surrounding space, the behavior deciding unit 151 can determine whether or not to make the robot device 1 express emotional expressions. Moreover, further based on the degree of attention of the user toward the robot device 1, the behavior deciding unit 151 can determine whether or not to make the robot device 1 express emotional expressions. The degree of attention of the user toward the robot device 1 can be calculated, for example, by the recognized-information managing unit 130 as explained earlier. As a result, in a situation in which the user visually confirms the actions of the robot device 1 with certainty, the behavior deciding unit 151 can make the robot device 1 take actions corresponding to emotional expressions.

More particularly, when the user has a high degree of attention toward the robot device 1, the behavior deciding unit 151 can determine to make the robot device 1 exhibit emotional expressions. On the other hand, when the user has a low degree of attention toward the robot device 1, the behavior deciding unit 151 can determine not to make the robot device 1 exhibit emotional expressions. Herein, the threshold value for the degree of attention of the user toward the robot device 1 can be, for example, set in advance. Moreover, the threshold value can be kept variable by the user.

When the user has a medium degree of attention toward the robot device 1 and when a predetermined condition is satisfied, the behavior deciding unit 151 can determine to make the robot device 1 exhibit emotional expressions. The predetermined condition implies a condition by which the robot device 1 is likely to spark an interest in the user. For example, the predetermined condition can be the distance between the user and the robot device 1, or can be a state in which the robot device 1 is visible to the user.

Moreover, further based on the attributes of the user, the behavior deciding unit 151 can determine about whether or not to make the robot device 1 exhibit emotional expressions. More particularly, based on the age or the gender of the user, based on the hobbies and the liking of the user, or based on the amount of knowledge of the user regarding the robot device 1; the behavior deciding unit 151 can modify the determination criterion for determining about whether or not to make the robot device 1 exhibit emotional expressions. For example, for a user who is determined to like living beings or children, in order to increase the frequency of exhibiting emotional expressions by the robot device 1, the behavior deciding unit 151 can modify the determination criterion for determining about whether or not to make the robot device 1 exhibit emotional expressions. As a result of reflecting the expectations or the preferences of the user, the behavior deciding unit 151 can make the robot device 1 take actions corresponding to emotional expressions in a more suitable situation for the user.

The behavior generating unit 152 generates actions corresponding to the emotional expressions exhibited by the robot device 1.

The actions corresponding to emotional expressions can be, for example, actions indicating or replicating the emotions, the character, or the thinking of the robot device 1. As a result of taking such actions, the robot device 1 becomes able to give the user an impression of having intentions, and thus becomes able to evoke the feelings of affection and personal attachment about itself in the user. More particularly, the actions corresponding to emotional expressions can be redundant actions that cause a decline in the efficiency of the robot device 1. For example, the actions corresponding to emotional expressions can be actions indicating the thinking, the hesitation, or the worrying at the time of action selection; or can be actions taken in a more cautious way, or in a more insecure way, or in a more exaggerated way at the time of action execution.

For example, the actions corresponding to emotional expressions can be actions given below in Table 3. These actions can be stored in advance in the robot device 1, or can be generated based on a machine learning algorithm such as a DNN (Deep Neural Network). Based on various parameters used in determining about whether or not to take actions corresponding to emotional expressions, the behavior generating unit 152 can decide about which actions corresponding to emotional expressions, from among the actions given in Table 3, are to be performed by the robot device 1. Alternatively, the behavior generating unit 152 can randomly decide about which actions corresponding to emotional expressions, from among the actions given in Table 3, are to be performed by the robot device 1.

TABLE 3

| Action selection | look around confused |
| --- | --- |
|  | appear deep in thought |
|  | Pretend that you are |
|  | performing an action that you |
|  | have not selected |
|  | make a mistake on purpose |
| Action execution | move slowly and carefully |
|  | Move while repeating pauses |
|  | Move away from obstacles in |
|  | a big circle |
|  | make noise and move |

The behavior control unit 153 controls the sequence and the timings of execution of the actions corresponding to emotional expressions as generated by the behavior generating unit 152. More particularly, the behavior control unit 153 controls the manner in which the actions corresponding to emotional expressions are added to the actions decided by the action decision managing unit 140, or controls the timings at which the actions corresponding to emotional expressions are executed with reference to the actions decided by the action decision managing unit 140. That is, the behavior control unit 153 controls the sequence and the timings of execution of the actions corresponding to emotional expressions in such a way that the actions corresponding to emotional expressions, which evoke the feelings of personal attachment in the user, and the actions decided by the action decision managing unit 140 are performed in a coordinated manner on the whole.

The drive control unit 160 outputs, to the driving unit 170, a control command for executing the actions decided by the action decision managing unit 140 and the actions corresponding to emotional expressions as generated by the behavior managing unit 150. More particularly, the drive control unit 160 calculates the difference between the state of the robot device 1 corresponding to the actions to be taken and the current state of the robot device 1, and outputs a control command to the driving unit 170 for reducing the calculated difference. As a result, the drive control unit 160 can make the robot device 1 take the decided actions. Meanwhile, the drive control unit 160 can generate the control command in a hierarchical manner or in a stepwise manner, and output it to the driving unit 170.

Based on the control command received from the drive control unit 160, the driving unit 170 drives the robot device 1. The driving unit 170 is a module for performing output to the real space and can include, for example, an engine, a motor, a speaker, a projector, a display, or a luminous device (for example, a light bulb, an LED, or a laser). Based on the control command received from the drive control unit 160, the constituent elements of the driving unit 170 are driven, so that the actions of the robot device 1 as generated by the action decision managing unit 140 and the behavior generating unit 152 are carried out.

As a result of having the configuration as explained above, the control device 100 can make the robot device 1 take actions that are easily understandable by the user in terms of intentions and meaning and that evoke the feelings of affection and personal attachment in the user (i.e., actions corresponding to emotional expressions). Moreover, in a situation in which the user expects the robot device 1 to take actions that evoke the feelings of affection and personal attachment, the control device 100 can make the robot device 1 take such actions. As a result, the control device 100 can effectively enhance the interest or the personal attachment of the user toward the robot device 1. Moreover, the control device 100 can make the robot device 1 take actions, which evoke the feelings of affection and personal attachment in the user, at effective timings so that the power consumption of the robot device 1 can be held down.

<3. Example of operations of control device>

Figure 4:
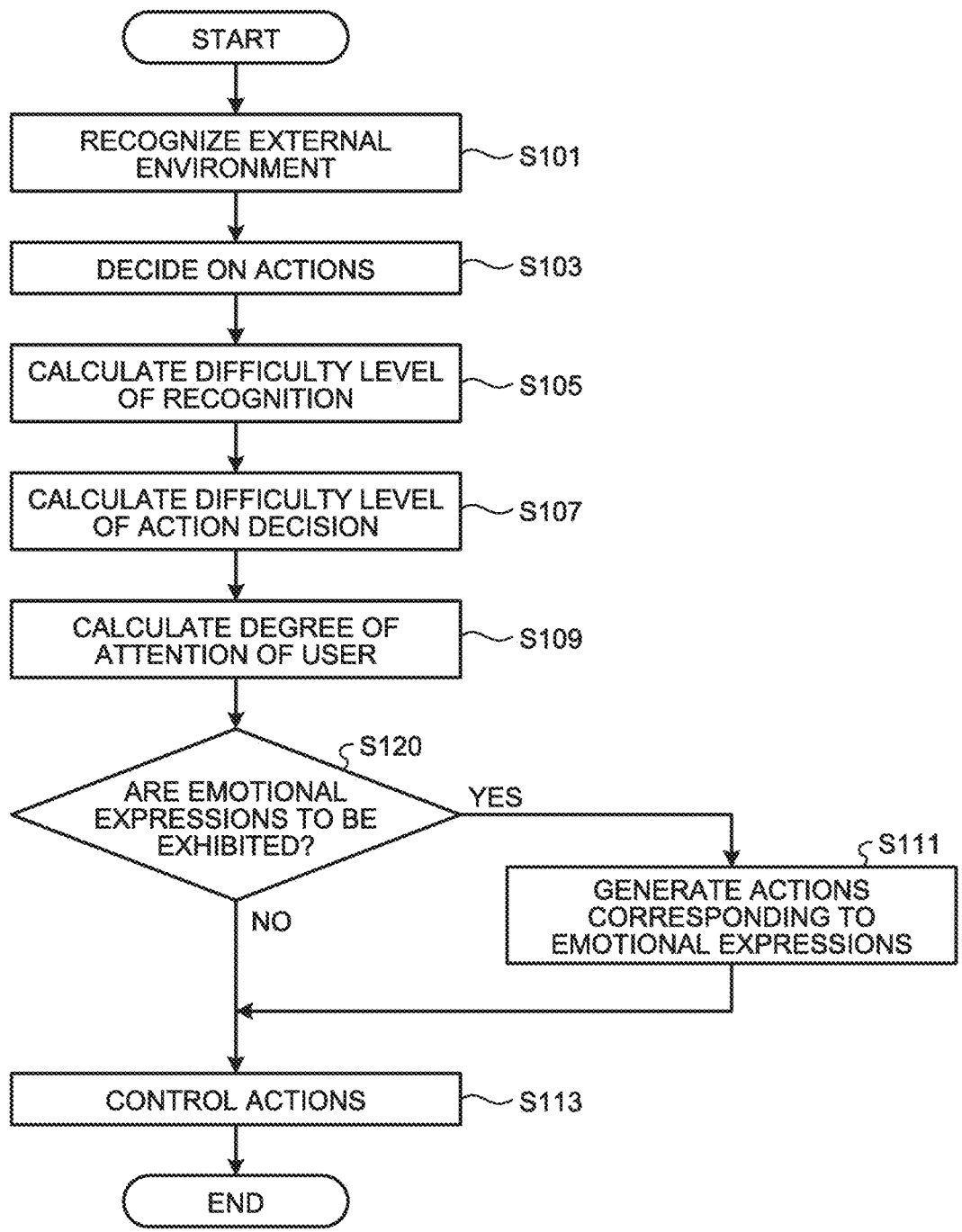
FIG. 4 is a flowchart for explaining an example of the overall flow of operations performed in the control device according to the present embodiment.
Figure 5:
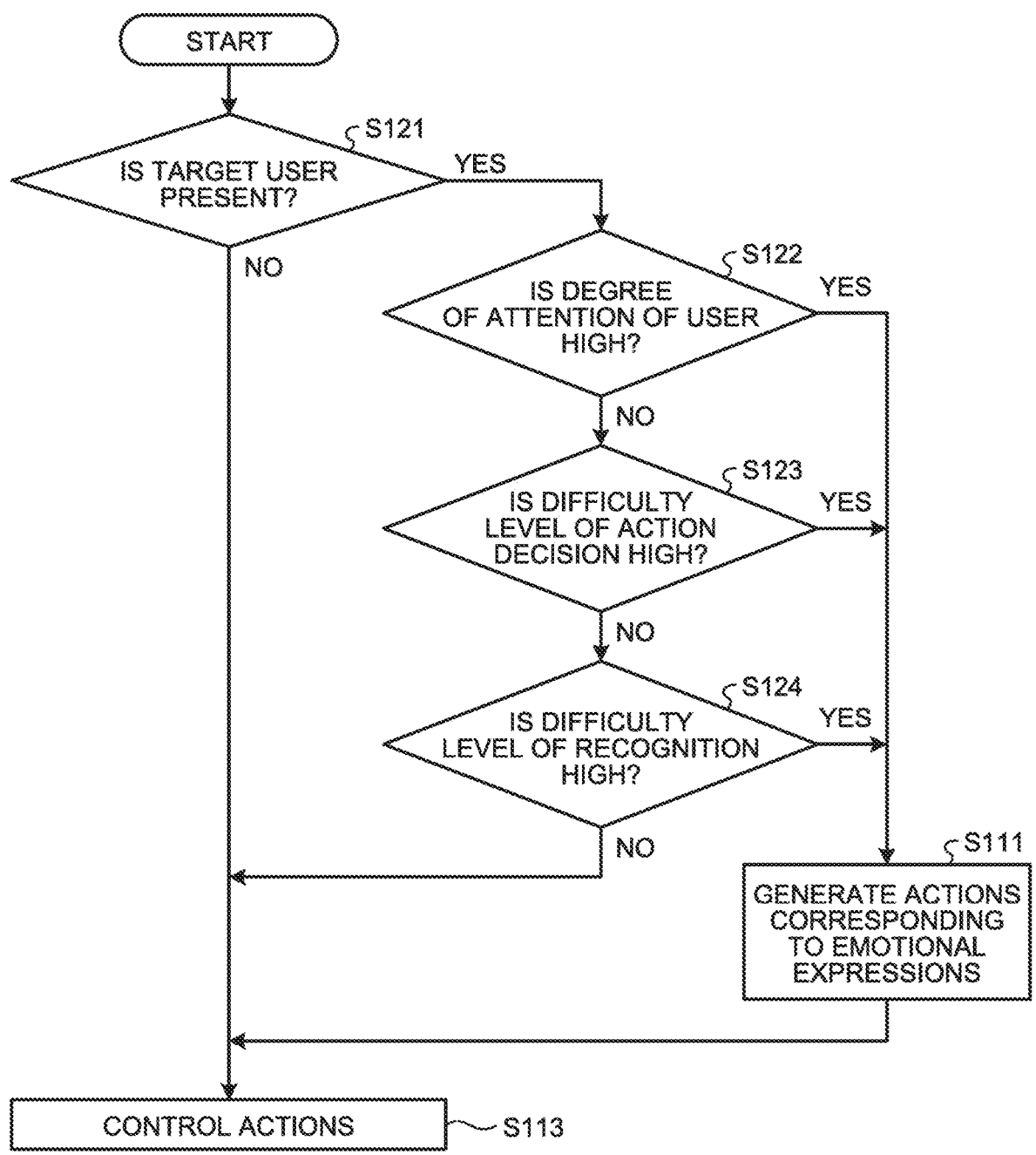
FIG. 5 is a flowchart for explaining, in a more specific manner, an example of the flow related to determination about whether or not to exhibit emotional expressions.

Explained below with reference to FIGS. 4 and 5 is an example of the operations performed in the control device 100 according to the present embodiment. FIG. 4 is a flowchart for explaining an example of the overall flow of operations performed in the control device 100 according to the present embodiment. FIG. 5 is a flowchart for explaining, in a more specific manner, an example of the flow related to the determination about whether or not to exhibit emotional expressions.

(3.1. Overall flow of operations)

Firstly, explained below with reference to FIG. 4 is the overall flow of operations performed in the control device 100 according to the present embodiment.

As illustrated in FIG. 4, firstly, the recognizing unit 120 recognizes the external environment based on the data measured by the sensor unit 110 (S101). Then, based on the recognized external environment, the action decision managing unit 140 calculates the actions to be taken by the robot device 1 (S103). Subsequently, the recognized-information managing unit 130 calculates the difficulty level of recognition according to the method explained earlier (S105), and calculates the degree of attention of the user toward the robot device 1 (S109). Moreover, the action decision managing unit 140 calculates the difficulty level of action decision (S107).

The calculation of the difficulty level of recognition (S105) and the calculation of the degree of attention of the user (S109) can be performed at arbitrary timings in between the recognition (S103) and the determination about whether or not to exhibit emotional expressions (S120). Moreover, the calculation of the difficulty level of action decision (S105) can be performed at an arbitrary timing in between the action decision (S103) and the determination about whether or not to exhibit emotional expressions (S120). Furthermore, the calculation of the difficulty level of recognition (S105), the calculation of the degree of attention of the user (S109), and the calculation of the difficulty level of action decision (S105) can be performed in a sequential order or can be performed in parallel.

Then, based on the degree of attention of the user, the difficulty level of recognition, and the difficulty level of action decision; the behavior deciding unit 151 determines about whether or not to exhibit emotional expressions that evoke the feelings of personal attachment in the user (S120). If the behavior deciding unit 151 determines not to exhibit emotional expressions (No at S120), then the drive control unit 160 controls the driving unit 170 to take actions decided by the action decision managing unit 140 (S113).

On the other hand, if the behavior deciding unit 151 decides to exhibit emotional expressions (Yes at S120), then the behavior generating unit 152 generates actions corresponding to emotional expressions (S111). Subsequently, the drive control unit 160 controls the driving unit 170 to take actions decided by the action decision managing unit 140 and to take the actions corresponding to emotional expressions (S113). Herein, it is the behavior control unit 153 that controls the timings at which the actions corresponding to emotional expressions are executed with reference to the actions decided by the action decision managing unit 140.

(3.2. Specific example of behavior determination)

With reference to FIG. 5, given below is the specific explanation of an example of the flow of the determination about whether or not to exhibit emotional expressions (S120) as illustrated in FIG. 4.

After the operations from S101 to S109 are performed, as illustrated in FIG. 5, the behavior deciding unit 151 firstly determines about whether or not the user, to whom the actions of the robot device 1 are to be made visible, is present in the surrounding space (S121). If it is determined that the target user is not present in the surrounding space (No at S121), the behavior deciding unit 151 determines not to exhibit emotional expressions and then the drive control unit 160 controls the driving unit 170 to take actions decided by the action decision managing unit 140 (S113).

On the other hand, if the target user is present in the surrounding space (Yes at S121), the behavior deciding unit 151 determines about whether or not the user has a high degree of attention toward the robot device 1 (S122), determines about whether or not the difficulty level of action decision is high (S123), and determines about whether or not the difficulty level of recognition is high (S124). If the determination at each of S121 to S123 yields a negative result, then the behavior deciding unit 151 determines not to exhibit emotional expressions, and then the drive control unit 160 controls the driving unit 170 to take actions decided by the action decision managing unit 140 (S113). On the other hand, if the determination at any one of S121 to S123 yields a positive result, then the behavior deciding unit 151 determines to exhibit emotional expressions. In that case, the behavior generating unit 152 generates actions corresponding to emotional expressions (S111), and the drive control unit 160 controls the driving unit 170 to take actions decided by the action decision managing unit 140 and to take the actions corresponding to emotional expressions (S113).

Meanwhile, the determination about whether or not to exhibit emotional expressions as performed by the behavior deciding unit 151 is not limited to the flow of operations illustrated in FIG. 5, and can be performed according to some other flow of operations. For example, the determination about whether or not to exhibit emotional expressions can be performed after determining, in a holistic manner, about whether or not the user has a high degree of attention toward the robot device 1, about whether or not the difficulty level of action decision is high, and about whether or not the difficulty level of recognition is high.

As a result of performing the operations explained above, in a situation in which the user expects the robot device 1 to take actions that evoke the feelings of affection and personal attachment, the control device 100 can selectively make the robot device 1 take such actions.

<4. Exemplary hardware configuration>

Figure 6:
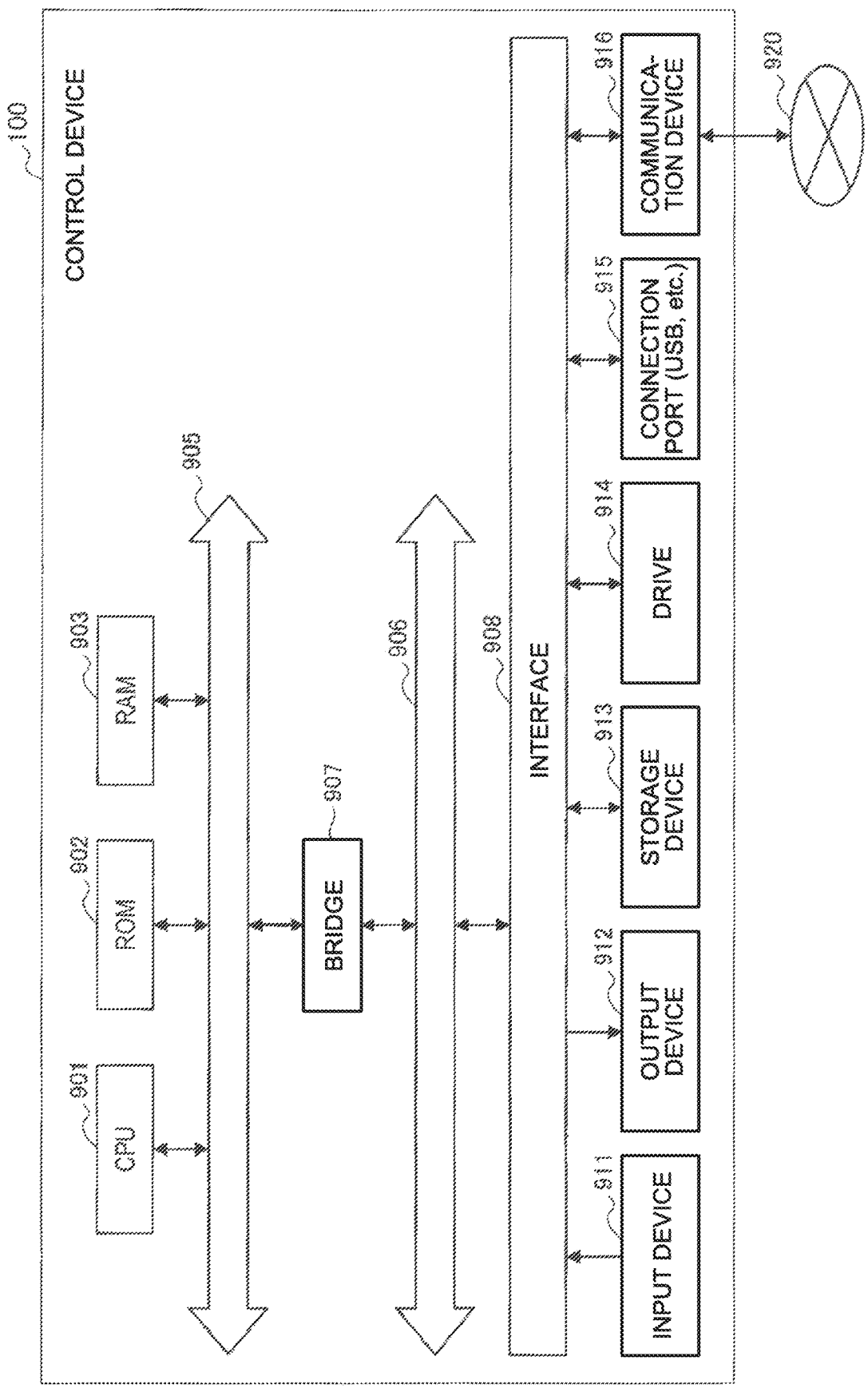
FIG. 6 is a block diagram illustrating an exemplary hardware configuration of the control device according to the present embodiment.

Explained below with reference to FIG. 6 is a hardware configuration of the control device 100 according to the present embodiment. FIG. 6 is a block diagram illustrating an exemplary hardware configuration of the control device 100 according to the present embodiment.

As illustrated in FIG. 6, the control device 100 includes a CPU (Central Processing Unit) 901, a ROM (Read Only Memory) 902, a RAM (Random Access Memory) 903, a bridge 907, internal buses 905 and 906, an interface 908, an input device 911, an output device 912, a storage device 913, a drive 914, a connection port 915, and a communication device 916.

The CPU 901 functions as an arithmetic processing device and controls the overall operations of the control device 100 according to various programs stored in the ROM 902. Herein, the ROM 902 is used to store the programs and operation parameters to be used by the CPU 901; and the RAM 903 is used to temporarily store the programs being executed by the CPU 901 and to store the parameters that undergo appropriate changes during the execution. For example, the CPU 901 can implement the functions of the recognizing unit 120, the recognized-information managing unit 130, the action decision managing unit 140, the behavior managing unit 150, and the drive control unit 160.

The CPU 901, the ROM 902, and the RAM 903 are connected to each other via the bridge 907 and the internal buses 905 and 906. Moreover, the CPU 901, the ROM 902, and the RAM 903 are connected to the input device 911, the output device 912, the storage device 913, the drive 914, the connection port 915, and the communication device 916 via the interface 908.

The input device 911 includes an input device such as a touch-sensitive panel, a keyboard, a mouse, buttons, a microphone, switches, or levers that receive input of information. Moreover, the input device 911 also includes an input control circuit that generates input signals based on the input information and outputs the input signals to the CPU 901.

The output device includes a display device such as a CRT (Cathode Ray Tube) display device, a liquid crystal display device, or an organic EL (Organic ElectroLuminescence) display device. Moreover, the output device 912 can also include a sound output device such as a speaker or headphones.

The storage device 913 is a memory device for storing data of the control device 100. The storage device 913 can include a memory medium, a memory device for storing data in the memory medium, a reading device for reading data from the memory medium, and a deleting device for deleting the stored data.

The drive 914 is a memory medium reading drive, and is either installed in the control device 100 or externally attached to the control device 100. For example, the drive 914 reads information stored in a removable disk such as a magnetic disk, an optical disk, a magneto-optical disk, or a semiconductor memory inserted therein; and outputs the information to the RAM 903. Moreover, the drive 914 is also capable of writing information in a removable memory medium.

The connection port 915 is a connection interface such as a USB (Universal Serial Bus) port, an Ethernet (registered trademark) port, an IEEE 802.11 standard port, or an optical audio terminal that is configured with a connection port for establishing connection with external connection equipment.

The communication device 916 is, for example, a communication interface configured with a communication device for establishing connection with a network 920. Moreover, the communication device 916 can be a communication device compatible to a wired LAN or a wireless LAN, or can be a cable communication device that performs cable communication using a wired cable.

Meanwhile, it is also possible to create a computer program by which the hardware including the CPU, the ROM, and the RAM embedded in the control device 100 implement functions equivalent to the configuration of the control device according to the present embodiment. Moreover, it is possible to provide a memory medium in which that computer program is stored.

5. Summary

As explained above, the control device 100 according to the present embodiment can make the robot device 1 take actions that are easily understandable by the user in terms of intentions and meaning and that evoke the feelings of affection and personal attachment in the user (i.e., actions corresponding to emotional expressions). Moreover, in a situation in which the user expects the robot device 1 to take actions that evoke the feelings of affection and personal attachment, the control device 100 can make the robot device 1 take such actions. As a result, the control device 100 can effectively enhance the interest or the personal attachment of the user toward the robot device 1. Moreover, the control device 100 can make the robot device 1 take actions, which evoke the feelings of affection and personal attachment in the user, at effective timings so that the power consumption of the robot device 1 can be held down.

Although the application concerned is described above in detail in the form of an embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

A control device comprising:
  a recognizing unit that recognizes external environment based on sensing information;
  an action decision managing unit that, based on the recognized external environment, decides on action to be taken;
  a behavior managing unit that, based on at least either difficulty level of recognition for the recognizing unit or difficulty level of action decision for the action decision managing unit, determines about whether or not to exhibit emotional expression; and a drive control unit that, based on determination performed by the behavior control unit, controls execution of action corresponding to the emotional expression.

(2) The control device according to (1), wherein the emotional expression implies expression causing decline in efficiency of action decided by the action decision managing unit.

(3) The control device according to (1) or (2), wherein, when difficulty level of recognition for the recognizing unit is determined to be high, the behavior managing unit determines to exhibit the emotional expression.

(4) The control device according to any one of (1) to (3), wherein difficulty level of recognition for the recognizing unit is determined based on at least one or more of count or types of sensors used in obtaining the sensing information,
complexity of the external environment,
recognition algorithm implemented by the recognizing unit, and
reliability or required accuracy of recognition result obtained by the recognizing unit.

(5) The control device according to any one of (1) to (4), wherein, when difficulty level of action decision for the action decision managing unit is high, the behavior managing unit determines to exhibit the emotional expression.

(6) The control device according to any one of (1) to (5), wherein difficulty level of action decision for the action decision managing unit is determined based on at least one or more of
number of options for the action to be taken,
presence or absence of relative merits or history, and
complexity or limiting condition of action decision by the action decision managing unit.

(7) The control device according to any one of (1) to (6), wherein the drive control unit controls execution of action of a robot device that is used as a robotic pet or an ornamental robot.

(8) The control device according to (7), wherein the emotional expression implies expression indicating emotion of the robot device.

(9) The control device according to (7) or (8), wherein the emotional expression implies such expression of the robot device which evokes feelings of personal attachment in user.

(10) The control device according to any one of (7) to (9), wherein, further based on presence of user of the robot device, the behavior managing unit determines about whether or not to exhibit the emotional expression.

(11) The control device according to (10), wherein, further based on degree of attention of the user toward the robot device, the behavior managing unit determines about whether or not to exhibit the emotional expression.

(12) The control device according to (11), wherein, when degree of attention of the user toward the robot device is determined to be high, the behavior managing unit determines to exhibit the emotional expression.

(13) The control device according to (11) or (12), wherein degree of attention of the user toward the robot device is determined based on at least one or more of image recognition of image of the user, speech recognition or context recognition of speech of the user, and input from the user.

(14) The control device according to any one of (10) to (13), wherein, further based on attribute of the user, the behavior managing unit determines whether or not to exhibit the emotional expression.

(15) The control device according to any one of (10) to (13), wherein determination criterion regarding difficulty level of recognition for the recognizing unit or regarding difficulty level of action decision for the action decision managing unit is modified based on the attribute of the user.

(16) The control device according to any one of (7) to (15), wherein the sensor information is obtained by a sensor unit installed in the robot device.

(17) A control method implemented in an arithmetic device, comprising:
recognizing external environment based on sensing information;
deciding that, based on the recognized external environment, includes deciding on action to be taken;
determining that, based on at least either difficulty level of recognition or difficulty level of action decision, includes determining about whether or not to exhibit emotional expression; and
controlling that, based on determination, includes controlling execution of action corresponding to the emotional expression.

(18) A program that causes a computer to function as:
a recognizing unit that recognizes external environment based on sensing information;
an action decision managing unit that, based on the recognized external environment, decides on action to be taken;
a behavior managing unit that, based on at least either difficulty level of recognition for the recognizing unit or difficulty level of action decision for the action decision managing unit, determines about whether or not to exhibit emotional expression; and
a drive control unit that, based on determination performed by the behavior control unit, controls execution of action corresponding to the emotional expression.

REFERENCE SIGNS LIST 1 robot device
5, 6 obstacle
100 control device
110 sensor unit
120 recognizing unit
121 person recognition unit
122 sound recognition unit
123 space recognition unit
130 recognized-information managing unit
140 action decision managing unit
150 behavior managing unit
151 behavior deciding unit 152 behavior generating unit
153 behavior control unit
160 drive control unit
170 driving unit

What is claimed is:

1. A control device, comprising:
a central processing unit (CPU) configured to:
recognize an external environment based on sensing information;
implement a recognition algorithm associated with the recognition of the external environment;
determine a first difficulty level of the recognition of the external environment based on at least one of the implemented recognition algorithm or an accuracy of the recognition;
determine a degree of attention of a user toward the control device;
determine a first exhibition of an emotional expression based on the first difficulty level of the recognition of the external environment and the degree of attention of the user toward the control device; and
control a first action based on the determined first exhibition of the emotional expression, wherein the first action corresponds to the emotional expression.

2. The control device according to claim 1, wherein the emotional expression is associated with a decline in an efficiency of the first action.

3. The control device according to claim 1, wherein, the CPU is further configured to determine the first exhibition of the emotional expression based on the first difficulty level of the recognition of the external environment being higher than a specific level.

4. The control device according to claim 1, wherein the CPU is further configured to determine the first difficulty level of the recognition of the external environment based on at least one of
a count of sensors or types of the sensors that obtain the sensing information, or
a complexity of the external environment.

5. The control device according to claim 1, wherein the control device is associated with a robot device.

6. The control device according to claim 5, wherein the emotional expression indicates an emotion of the robot device.

7. The control device according to claim 5, wherein the emotional expression of the robot device evokes feelings associated with a personal attachment in the user.

8. The control device according to claim 1, wherein the CPU is further configured to determine the first exhibition of the emotional expression based on the determined degree of attention being higher than a specific degree.

9. The control device according to claim 1, wherein the CPU is further configured to determine the degree of attention of the user toward the control device based on at least one of
image recognition of an image of the user,
one of speech recognition of a speech of the user or context recognition of the speech of the user, or
an input from the user.

10. The control device according to claim 1, wherein the CPU is further configured to determine the first exhibition of the emotional expression based on an attribute of the user.

11. The control device according to claim 10, wherein the CPU is further configured to modify a determination criterion, associated with the first difficulty level of the recognition of the external environment, based on the attribute of the user.

12. The control device according to claim 1, wherein the CPU is further configured to determine a second action based on the recognized external environment, a second action to be taken.

13. The control device according to claim 12, wherein the CPU is further configured to determine a second difficulty level associated with the determination of the second action based on at least one of
a number of options for the second action,
one of a presence or an absence of relative merits or history,
a complexity of the second action, or
a limiting condition of the second action.

14. The control device according to claim 13, wherein the CPU is further configured to determine a second exhibition of the emotional expression based on the second difficulty level of the second action being higher than a specific level.

15. A control method, comprising:
in a control device:
recognizing an external environment based on sensing information;
implementing a recognition algorithm associated with the recognition of the external environment;
determining a first difficulty level of the recognition of the external environment based on at least one of the implemented recognition algorithm or an accuracy of the recognition;
determining a degree of attention of a user toward the control device;
determining a first exhibition of an emotion expression based on the first difficulty level of the recognition of the external environment and the degree of attention of the user toward the control device; and
controlling a first action based on the determined first exhibition of the emotional expression, wherein the first action corresponds to the emotional expression.

16. The control method according to claim 15, wherein the emotional expression is associated with a decline in an efficiency of the first action.

17. The control method according to claim 15, further comprising determining the first exhibition of the emotional expression based on the first difficulty level of the recognition of the external environment being higher than a specific level.

18. The control method according to claim 15, further comprising determining the first difficulty level of the recognition of the external environment based on at least one of
a count of sensors or types of the sensors that obtain the sensing information, or
a complexity of the external environment.

19. The control method according to claim 15, further comprising determining a second action based on the recognized external environment.

20. The control method according to claim 19, further comprising determining a second difficulty level associated with the determination of the second action based on at least one of
a number of options for the second action,
one of a presence or an absence of relative merits or history,
a omplexity of the second action, or
a limiting condition of the second action.

* * * * *